Jan. 14, 1969     D. C. DRYBURGH     3,422,290
APPARATUS FOR GENERATING ELECTRICAL POWER
Filed June 21, 1965

Inventor
David Campbell Dryburgh
By
Cushman, Darby & Cushman
Attorneys

United States Patent Office 3,422,290
Patented Jan. 14, 1969

3,422,290
APPARATUS FOR GENERATING ELECTRICAL POWER
David Campbell Dryburgh, Littleover, Derby, England, assignor to Rolls-Royce Limited, Derby, England, a British company
Filed June 21, 1965, Ser. No. 465,512
Claims priority, application Great Britain, July 2, 1964, 27,459/64
U.S. Cl. 310—11   13 Claims
Int. Cl. H02k 45/00

ABSTRACT OF THE DISCLOSURE

Electrical power-generating apparatus comprising first and second power-generating fluid circulation systems which do not communicate with each other, and a heat exchanger having fluid paths therethrough which form respectively, parts of the first and second systems. The first system has a heater upstream of the heat exchanger and steam-raising plant downstream thereof; the second system comprises a closed cycle magneto-hydrodynamic (MHD) power plant. There is provided a change-over device periodically changing over the particular fluid paths in the heat exchanger which respectively communicate with the closed MHD plant and with the heater.

---

This invention concerns apparatus for generating electrical power.

According to the present invention there is provided apparatus for generating electrical power, comprising a first and a second fluid circulation system which are always out of fluid flow communication with one another and each of which is adapted to generate electrical power, a heat exchanger having a first and a second fluid path therethrough which form, respectively, part of said first and second systems, said first system including a heater upstream of the heat exchanger and a steam raising plant downstream thereof, said second system forming a closed loop and including a duct through which may circulate a hot electrically conductive gas, means for creating a magnetic field across a portion of said duct downstream of said second fluid path, the direction of the magnetic field being at right angles to the direction of the gas flow through said portion, an electrical circuit in which, in operation, induced current will flow and a changeover device for periodically changing over the particular fluid paths in said heat exchanger which respectively communicate with the said duct and with the said heater.

The said heater may be a combustion chamber, a second heater exchanger being provided through which flow, in heat exchange with each other, a supply of air for the combustion chamber and a stream of combustion gases from the combustion chamber.

The combustion gases which have left the combustion chamber preferably flow through the first mentioned heat exchanger before passing through the second heat exchanger.

The said conduit on the downstream side of the first-mentioned heat exchanger, preferably incorporates a steam raising plant.

Preferably seed injecting means, disposed between the first-mentioned heat exchanger and the said portion, are provided for injecting thermionically emitting seed into the hot gas in said duct to render it electrically conductive, there being provided seed extracting means, disposed between the said portion and the said first-mentioned heat exchanger, for extracting the seed from the said hot gas, and means for passing the seed so extracted to the seed injecting means.

The seed, which may be that of a metal or metallic compound, may, for example, be potassium, sodium, caesium, barium oxide or thorium oxide seed, whilst the gas in the duct may be helium, neon or argon.

Figure 1:
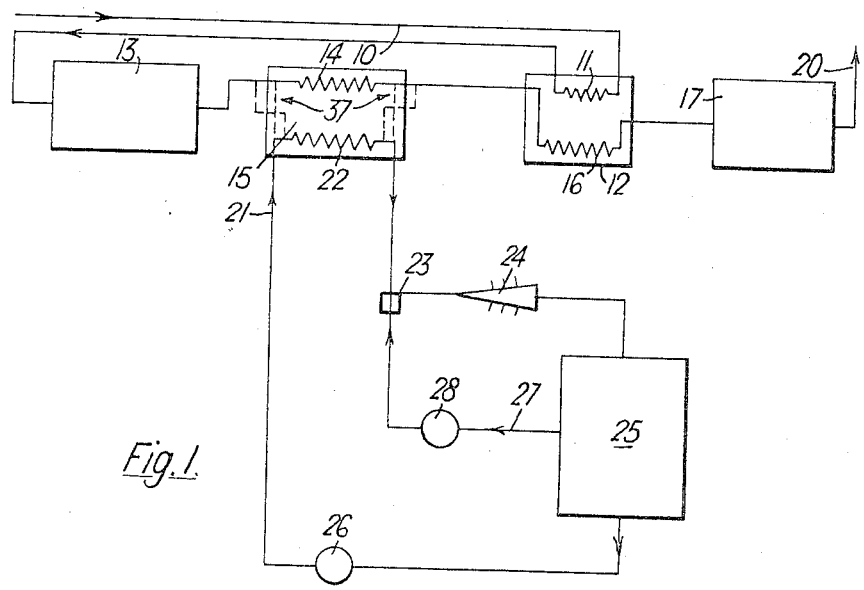
Figure 2:
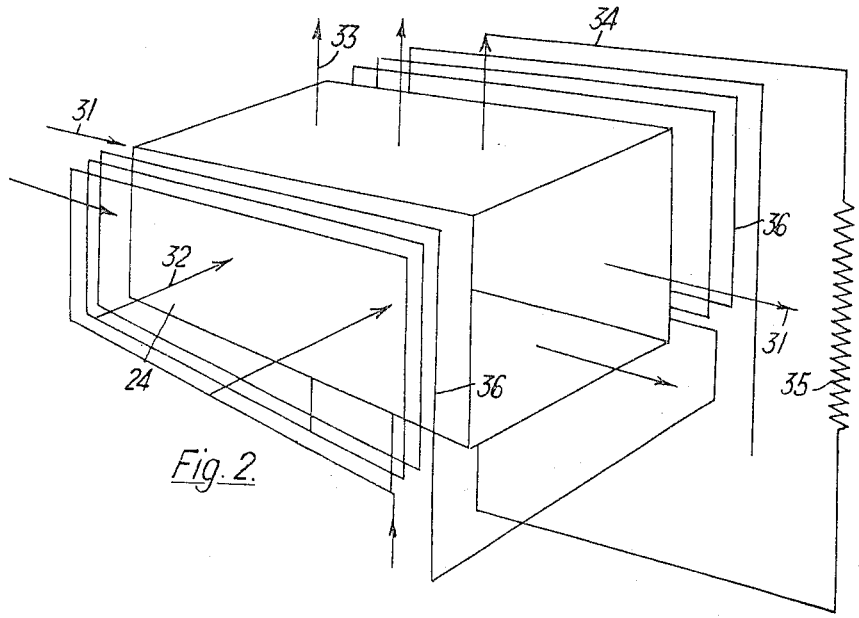

The invention is illustrated, merely by way of example, in the accompanying diagrammatic drawings, in which:

FIGURE 1 is a flow diagram of apparatus for generating electrical power according to the present invention, and FIGURE 2 illustrates diagrammatically a component of the apparatus shown in FIGURE 1.

In FIGURE 1 there is shown apparatus for generating electrical power comprising a conduit 10 whose upstream end is open to a supply of air. The conduit 10 incorporates in flow series a path 11 through a heat exchanger 12, a combustion chamber 13 in which the air is used for the combustion of a fossil fuel, e.g. coal or oil, a path 14 through a heat exchanger 15, a path 16 through the heat exchanger 12 (the said paths 11, 16 being in heat exchange relationship with each other), and a steam raising plant 17 forming part of conventional steam turbine electrical power generating equipment. The flue gases leave the conduit 10 through the downstream end 20 thereof.

The apparatus also comprises a duct 21 which forms a closed loop and which contains helium or some other inert gas. The duct 21 comprises, in flow series, a fluid path 22 through the heat exchanger 15 which is in heat exchange relationship with the path 14, a seed injecting device 23 for injecting caesium (or sodium, or potassium, or barium oxide, or thorium oxide) seed into the said gas, a duct member 24 whose purpose is described in greater detail below, a seed extracting device 25 for extracting the said seed from the gas, and a pump 26. The seed extracted in the device 25 is passed to the seed injecting device 23 by way of a conduit 27 incorporating a pump 28.

The duct member 24 serves to diffuse the hot gas flowing therethrough, the direction of flow being indicated by arrows 31 (FIG. 2). An electro-magnet 36 is provided for creating a magnetic field across the duct member 24, the direction of the said magnetic field, as indicated by arrows 32, being at right angles to the direction of flow through the duct member 24.

The hot gas flowing through the duct member 24 will be ionised by virtue of being seeded with the caesium seed and will therefore be a good electrical conductor. In these circumstances, and as indicated by arrows 33, electrical current will be induced at right angles to the direction of the said magnetic field. The said electrical current may flow in any direction between the directions indicated by the arrows 31, 33 depending upon the construction of the apparatus.

An electrical circuit 34, in which the said induced current will flow, incorporates a load 35 and is provided with electrodes (not shown) on opposite sides of the duct member 24. If desired, there may be a number of such electrical circuits 34.

It will be appreciated that in the apparatus described above, no caesium seed will enter the combustion gases, since there is no communication between the duct 21 and conduit 10. The corrosive effect which would otherwise be produced in the heat exchangers 12, 15 is therefore avoided.

It will also be apprecitaed that in the apparatus described above there will be no loss of caesium seed in the duct 21, whilst the recovery of this seed in the seed extracting device 25 need not be such as to cause a serious lowering of the temperature of the gases supplied to the steam raisig plant 17. It is desirable that these gases should be as hot as possible, because possibly 75% to 80% of the total power output of the apparatus may be derived from the steam raising plant 17.

The heat exchanger 15 is provided with a changeover device 37 incorporating valves (not shown) for periodically changing over the particular paths 14, 22 which respectively communicate with the duct 21 and with the conduit 10, whereby each of the paths 14, 22 may be alternately heated by the fluid stream passing through the conduit 10 and then cooled by the fluid stream passing through the duct 21. The arrangement is such that very little contamination of one stream by the other occurs and very little loss of seed takes place.

I claim:

1. Apparatus for generating electrical power comprising: a first and a second fluid circulation system which are always out of fluid flow communication with one another and each of which is adapted to generate electrical power, a heat exchanger having a first and a second fluid path therethrough which form, respectively, part of said first and second systems, said first system including a heater upstream of the heat exchanger and a steam raising plant downstream thereof, said second system forming a closed loop and including a duct through which may circulate a hot electrically conductive gas, means for creating a magnetic field across a portion of said duct dnowstream of said second fluid path, the direction of the magnetic field being at right angles to the direction of the gas flow through said portion, an electrical circuit in which, in operation, induced current will flow and a change-over device for periodically changing over the particular fluid paths in said heat exchanger which respectively communicate with the said duct and with the said heater.

2. Apparatus as claimed in claim 1 in which said heater is constituted by a combustion chamber, and in which a second heat exchanger is provided for flow of a supply of air for the combustion chamber in heat exchange relationship with a stream of combustion gases from the combustion chamber.

3. Apparatus as claimed in claim 2 in which the combustion gases which have left the combustion chamber flow through the first-mentioned heat exchanger before passing through the second heat exchanger.

4. Apparatus as claimed in claim 1 wherein seed injecting means is disposed between the heat exchanger and the said portion for injecting thermionically emitting seed into the hot gas in said duct to render it electrically conductive, there being seed extracting means, disposed between the said portion and the said heat exchanger, for extracting the seed from the said hot gas, and means for passing the seed so extracted to the seed injecting means.

5. Apparatus as claimed in claim 4 in which the seed is selected from the group comprising metals and metal compounds.

6. Apparatus as claimed in claim 4 in which the seed is potassium seed.

7. Apparatus as claimed in claim 4 in which the seed is sodium seed.

8. Apparatus as claimed in claim 4 in which the seed is barium oxide seed.

9. Apparatus as claimed in claim 4 in which the seed is thorium oxide seed.

10. Apparatus as claimed in claim 4 in which the seed is caesium seed.

11. Apparatus as claimed in claim 4 in which the gas in the duct is helium.

12. Apparatus as claimed in claim 4 in which the gas in the duct is neon.

13. Apparatus as claimed in claim 4 in which the gas in the duct is argon.

References Cited

UNITED STATES PATENTS 3,264,501　8/1966　Kantrowitz et al. _____ 310—11

DAVID X. SLINEY, *Primary Examiner.*